United States Patent
Delianski et al.

(10) Patent No.: US 8,805,011 B2
(45) Date of Patent: Aug. 12, 2014

(54) METHOD AND APPARATUS FOR EXAMINING AN ITEM IN WHICH AN AUTOMATED EVALUATION UNIT UNDERGOES A LEARNING PROCESS

(75) Inventors: Svetlozar Delianski, Berlin (DE); Ilian Pashov, Constance (DE)

(73) Assignee: Siemens Aktiengesellschaft, Munich (DE)

( * ) Notice: Subject to any disclaimer, the term of this patent is extended or adjusted under 35 U.S.C. 154(b) by 177 days.

(21) Appl. No.: 13/398,017

(22) Filed: Feb. 16, 2012

(65) Prior Publication Data

US 2012/0207351 A1  Aug. 16, 2012

(30) Foreign Application Priority Data

Feb. 16, 2011  (DE) .......................... 10 2011 004 185

(51) Int. Cl.
*G06K 9/00* (2006.01)

(52) U.S. Cl.
USPC ....................................... 382/103

(58) Field of Classification Search
None
See application file for complete search history.

(56) References Cited

U.S. PATENT DOCUMENTS

| 8,406,520 B2* | 3/2013 | Henkel .......................... 382/173 |
| 2004/0024694 A1* | 2/2004 | Lawrence et al. ................ 705/38 |
| 2007/0041613 A1* | 2/2007 | Perron et al. ................... 382/103 |
| 2008/0089479 A1* | 4/2008 | Henkel .......................... 378/57 |
| 2009/0175411 A1* | 7/2009 | Gudmundson et al. ......... 378/57 |
| 2012/0207351 A1* | 8/2012 | Delianski et al. ............. 382/103 |

FOREIGN PATENT DOCUMENTS

| WO | 2008119151 A1 | 10/2008 |
| WO | 2010145016 A1 | 12/2010 |

\* cited by examiner

*Primary Examiner* — Tahmina Ansari
(74) *Attorney, Agent, or Firm* — Laurence A. Greenberg; Werner H. Stemer; Ralph E. Locher

(57) ABSTRACT

An examination apparatus examines an item including a person or a container and has a determination unit for determining a relevance level which can be assigned to the item under examination, in particular a hazard level, and an image capture unit for capturing an image of the item under examination. The examination apparatus has a database, an automated evaluation unit for automatically evaluating at least one section of the image using the database, an evaluation unit operated by a user for the visual evaluation of a section of the image by the user, and an input unit for inputting at least one evaluation input by the user, and a database processing unit for processing the database. The database processing unit processes a database entry using the evaluation input in conjunction with the determination of the relevance level.

8 Claims, 2 Drawing Sheets

METHOD AND APPARATUS FOR EXAMINING AN ITEM IN WHICH AN AUTOMATED EVALUATION UNIT UNDERGOES A LEARNING PROCESS

CROSS-REFERENCE TO RELATED APPLICATION

This application claims the priority, under 35 U.S.C. §119, of German application DE 10 2011 004 185.0, filed Feb. 16, 2011; the prior application is herewith incorporated by reference in its entirety.

FIELD OF THE INVENTION

The invention is based on an examination apparatus for examining an item under examination in the form of a person and/or a container, having a determination unit which is intended to determine a relevance level which can be assigned to the item under examination, in particular a hazard level and an image capture unit for capturing an image of the item under examination. The examination apparatus further has a database, an automated evaluation unit which is intended to automatically evaluate at least one section of the image using the database, an evaluation unit which can be operated by a user and is intended for the visual evaluation of at least one section of the image by the user, an input unit which is intended for the input of at least one evaluation input by the user, and a database processing unit for processing the database.

U.S. patent disclosure No. 2007/0041613 A1 discloses an examination apparatus of the generic type. The latter is intended to examine containers which potentially comprise items which jeopardize safety, for example weapons. The apparatus has an image capture unit which captures an image of the container contents. This image is evaluated by an image evaluation unit using an object database for recognizing hazardous objects. The examination apparatus also contains a further evaluation unit having a user interface in the form of an operator interface which can be used by the user to visually evaluate the recorded image. In order to process the object database, in particular to supplement the object database, a previously known object which corresponds to a certain hazard level is captured by the image capture unit outside normal operation of the examination apparatus. In this case, images of the object, in particular in different orientations, are recorded and are used as new database entries for subsequent evaluation operations.

SUMMARY OF THE INVENTION

On the basis of this prior art, the invention is based on the object of providing an examination apparatus of the generic type in which automation in the determination of the relevance level can be quickly and efficiently optimized.

The object is achieved by virtue of the fact that the database processing unit is intended to process at least one database entry using the evaluation input in conjunction with the determination of the relevance level. As a result, a user input which is conventionally input by the user anyway when visually evaluating the image can be advantageously used to optimize automatic determination of the relevance level.

The evaluation input by the user can be made, in particular, on the basis of evaluation of the image which is carried out by the automated evaluation unit. During this evaluation, the automated evaluation unit preferably attempts to assign a reference item to the image using the database, the recognition of which reference item in the item under examination corresponds to a particular relevance level, for example a low or high risk. For this purpose, assignments of image data to such reference items are advantageously entered in the database.

For example, the evaluation input may be a confirmation or rejection of such an automatic assignment. In addition, the evaluation input may correspond to a confidence parameter which is assigned to the automatic assignment. The evaluation input may also be an input on the basis of a lack of an automatic assignment, in particular relating to a reference item which is not contained in the database.

The database may be stored locally at the examination location. For this purpose, the examination apparatus may have a storage unit for storing the database to which the automated evaluation unit and/or the database processing unit directly has/have access. Alternatively or additionally, the database may be stored on a database server which is remote from the examination location and can be accessed via a data network. For this purpose, the examination apparatus may advantageously have an interface by which the automated evaluation unit and/or the database processing unit has/have access to the database via the data network.

Processing which is carried out "in conjunction with the determination of the relevance level" is intended to be understood as meaning processing using data which originate from the determination of the relevance level for the item under examination which is currently being examined by the examination apparatus and has at least partially unknown, and conventionally completely unknown, contents before the start of the examination. These data are obtained under the real conditions of normal operation of the examination apparatus, in which a series of persons or containers is typically examined. As a result of the fact that the database is processed in conjunction with the determination of the relevance level, evaluation inputs which originate from the examination under real conditions, that is to say conditions which have not been simulated, are advantageously taken into account, as a result of which the database can be optimally adapted to these real conditions. If the item under examination corresponds to a person to be examined, the "contents" of the item under examination are formed by objects carried on the person's body.

In this context, the evaluation inputs which are produced in conjunction with the determination of the relevance level can be collected or stored for subsequent processing of the database. In this case, the database can be processed using the different evaluation inputs, which were produced with respect to the determination of the relevance levels for a series of different items under examination, after the end of normal operation of the examination apparatus, in which the series was examined.

However, it is advantageous if the examination apparatus has an examination mode in which a series of items under examination each having at least partially unknown, and conventionally completely unknown, contents are examined, the database being processed during the examination mode. The processing of the database in conjunction with the determination of the relevance level for a particular item under examination can be at least partially carried out in this case while determining the reference level for a further item under examination in the series. However, it is preferred for the database to be processed, as far as possible, without delay after the evaluation input has been input, as a result of which the processed database can already be available for subsequent examinations of further items under examination.

A "relevance level" is intended to be understood as meaning, in particular, a parameter which can be assigned to the item under examination and characterizes the relevance of the item under examination with respect to further handling. In one advantageous use of the examination apparatus during a security check of travelers or transported goods, the relevance level corresponds to a hazard level with which defined safety measures for handling the item under examination are associated. The relevance level can be alternatively or additionally associated with the detection of objects or substances which are not an immediate hazard but are legally prohibited, for example during the examination of freight containers by a customs authority.

"Processing" of a database entry is intended to be understood as meaning, in particular, changing, adapting, replacing and/or deleting an existing database entry. The processing of a database entry can also alternatively or additionally correspond to the generation of a new database entry using the evaluation input, as proposed in one advantageous development of the invention. This makes it possible to quickly and easily supplement the database with a new reference item.

In order to quickly evaluate the captured image by the automated evaluation unit, the invention proposes that the database entry contains image data which are assigned to a reference item and are stored in at least one format suitable for an image recognition method. In a particularly advantageous manner, the format corresponds to a vector format, as a result of which a recognition operation taking place using these image data can be carried out independently of the orientation of objects inside the image.

One preferred embodiment of the invention proposes that the database processing unit is intended to process the image data relating to the database entry using at least one region of the image evaluated by the user. In this case, a region of the visually evaluated image corresponding to at least one section of the image captured by the image capture unit, which region is selected by the user, is expediently taken into account when processing the database entry. This region can be advantageously selected by the user on the basis of good distinctiveness, as a result of which the image region which, after the database entry has been processed, is stored in the database entry in the form of image data can be identified by the automated evaluation unit in images of further items under examination.

It is also proposed that the database entry contains a confidence parameter which affects the assignment to the reference item. The confidence parameter advantageously has the function of a quality parameter which characterizes the recognition strength of the stored image data with respect to a particular reference item.

In this context, one development of the invention proposes that a threshold value of the confidence parameter is defined, the threshold value constituting a prerequisite for automatic determination of the relevance level using the automated evaluation unit. The confidence parameter is preferably defined in such a manner that it increases with increasing recognition strength of the image data. If the threshold value has not been reached, that is to say the confidence parameter is less than the threshold value, the image is preferably, as an alternative or in addition to the automated evaluation, visually evaluated using the evaluation unit which can be operated by the user since the recognition strength of the existing image data is not sufficient for automatic assignment. If the threshold value has been reached, the relevance level can be automatically determined by the automated evaluation unit, in which case it is possible to dispense with additional visual evaluation of the image.

One preferred development of the invention proposes that the database processing unit is intended to change the confidence parameter using the evaluation input. This makes it possible to achieve an advantageous learning process of the automated evaluation unit, as a result of which the determination operations which are carried out by the automated evaluation unit and result in the relevance level being automatically determined without additional visual evaluation by the user can be increased.

The invention also proposes a method for examining an item under examination in the form of a person and/or a container. In order to determine a relevance level which can be assigned to the item under examination, an image of the item under examination is captured, at least one section of the image is automatically evaluated using a database, at least one section of the image is visually evaluated by the user, an evaluation input being input by the user, and in which the database is processed, at least one database entry being processed using the evaluation input in conjunction with the determination of the relevance level.

Other features which are considered as characteristic for the invention are set forth in the appended claims.

Although the invention is illustrated and described herein as embodied in an examination apparatus for examining an item under examination in the form of a person and/or a container, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
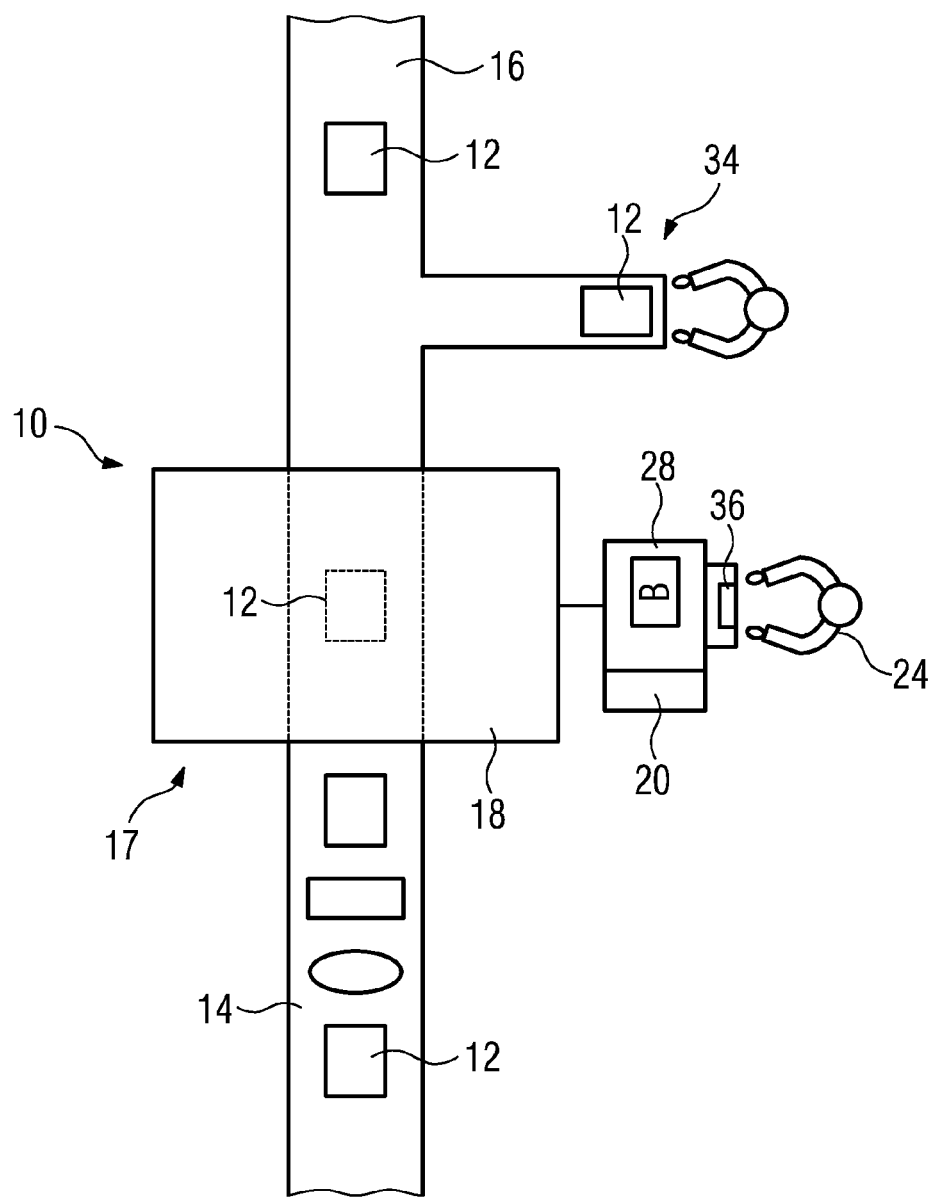
FIG. 1 is an illustration of an examination apparatus according to the invention having an image capture unit and an image evaluation unit as well as feed and removal conveyors in a view from above according to the invention.

Referring now to the figures of the drawing in detail and first, particularly, to FIG. 1 thereof, there is shown an examination apparatus 10 for examining items under examination 12 in the form of pieces of luggage at an airport in a highly schematic view from above. The function of the examination apparatus 10 is to assign a hazard level to an item under examination 12 by analyzing the contents of the latter. The examination is known to take place after the passenger has handed over the piece of luggage during check-in and before the piece of luggage is conveyed further to the associated aircraft. A feed conveyor 14 and a removal conveyor 16 are provided for the purpose of conveying the pieces of luggage to and from the examination apparatus 10. In an alternative embodiment, an examination apparatus 10 which is used to examine passengers and/or their hand luggage at the conventional security checks at the airport is conceivable.

The examination mode of the examination apparatus 10, in which items under examination 12 in a series are examined in succession, is explained using FIG. 1. Before passing through the examination apparatus 10, the contents of the items under examination 12 are unknown or partially unknown to airport personnel. For each item under examination 12, the hazard level which can be assigned to the item under examination 12 is determined using a determination unit 17.

In order to determine the hazard level for an item under examination 12, the latter is first of all transported to an image capture unit 18 using the feed conveyor 14. In the exemplary embodiment under consideration, the image capture unit 18 is in the form of an X-ray scanner which generates an X-ray image B of the item under examination 12, in particular the contents of the latter. Further designs of the image capture unit 18 which allow image capture of the contents of an item under examination 12 without manual examination, for example in the form of a scanner which operates using terahertz radiation, are likewise possible.

Figures 2, 3:
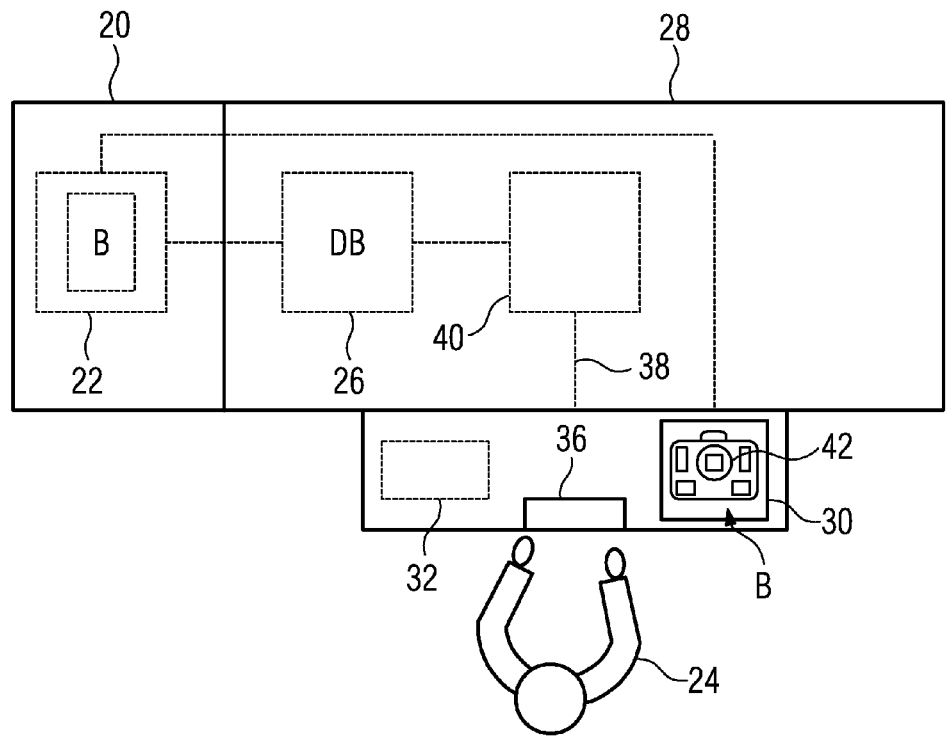
FIG. 2 is an illustration of a detailed view of the image evaluation unit and an enlargement of a captured image.
FIG. 3 is an illustration of a database of the image evaluation unit.\

In order to evaluate the image B, the examination apparatus 10 has a first image evaluation unit 20 which is intended to automatically evaluate the image B, to be precise is intended to automatically recognize a hazardous item in the item under examination 12, in particular. For this purpose, the image evaluation unit 20, which is illustrated in more detail in a detailed view in FIG. 2, is operatively connected to the image capture unit 18. The image evaluation unit 20 is provided with a computation unit 22 (FIG. 2) which evaluates the image B captured by the image capture unit 18 using image recognition software. For this purpose, use is made of data from a database DB which stores assignments of prestored image data BD to reference items G (FIG. 3) which are potentially in the items under examination 12 and constitute a hazard or conversely correspond to harmless items. When evaluating the image B, the computation unit 22 compares the image B with the stored image data BD in the database DB, the attempt to recognize one of the reference items G in the item under examination 12 being carried out in a fully automatic manner, that is to say without visual evaluation by a user 24 and/or without an input by the user 24.

The database DB is stored in a storage unit 26, the evaluation unit 20, to be precise its computation unit 22 in particular, being operatively connected to the storage unit 26. Alternatively or additionally, the database DB may be stored on a database server which is remote from the examination location and is not illustrated in the figure, the evaluation unit 20 having access to this database server by an interface via a data network.

The determination unit 17 also has a second evaluation unit 28 which is operated by the user 24. The second evaluation unit 28 enables visual evaluation of the image B by the user 24 and contains, for this purpose, a display unit 30 which displays the image B to the user 24. The evaluation unit 28 is provided with a computation unit 32 which makes it possible for the user 24 to process the image B, in particular to magnify the image B and/or to extract a suspicious region from the image B. The user 24 uses the image B to make a decision on the further handling of the item under examination 12.

If there is no suspicion with respect to the item under examination 12, the latter is conveyed further without further examination, the decision corresponding to a "release". The user 24 can also decide that manual examination should be carried out in an examination station 34, the decision corresponding to a "non-release". In this case, the item under examination 12 is removed from the conveying flow and is manually examined. The decision made ("release" or "non-release") and the reasons for this decision are input as an evaluation input 38 by the user 24 using an input unit 36.

The user 24 can also confirm the result of the evaluation of the image B, as carried out by the automated evaluation unit 20, by visually evaluating the image B, if the visual evaluation of the image B corresponds to the automatic evaluation, or can reject the result if the two evaluations do not correspond. This evaluation input 38 is used to enable a learning process of the automated evaluation unit 20. The examination apparatus 10 provides for a particular hierarchy which is used to control a decision-making authorization of the automated evaluation unit 20 relating to the hazard level, and therefore the further handling of the item under examination 12, with respect to the visual evaluation unit 28 and is subsequently specified in more detail below. The practice of taking into account the evaluation inputs 38 input by the user 24 advantageously makes it possible to increase the number of cases in which the automated evaluation unit 20 automatically determines the hazard level in order to thus increase the autonomy of the examination apparatus 10.

FIG. 3 shows a schematic view of the database DB. The latter has database entries DB.1, DB.2, . . . , DB.i etc. A database entry, for example DB.1, substantially corresponds to the assignment of image data, for example BD.1, to a respective reference item, G.1 in this example, which corresponds to a particular hazard level. A plurality of sets of image data (for example BD.2, BD.3) can be assigned to a reference item (for example G.2). The image data BD.i are stored in a format suitable for image recognition by the computation unit 22 of the automated evaluation unit 20, as described above. In particular, the image data BD.i are stored in a vector format.

The database entries DB.i also each contain a confidence parameter V.i which affects the corresponding assignment of the image data BD.i to a reference item G.j. A threshold value of the confidence parameter V, which is used to define the decision-making authorization of the automated evaluation unit 20, is defined in the examination apparatus 10. The threshold value constitutes a prerequisite for automatically determining the relevance level using the automated evaluation unit 20.

If, for a database entry DB.i, the confidence parameter V.i is at this threshold value or above this threshold value, the automated evaluation unit 20 is authorized, when a reference item is recognized in the image B, to itself make a decision on the item under examination 12, that is to say to determine the hazard level, without the image B being forwarded to the visual evaluation unit 28 for evaluation by the user 24. The automated evaluation unit 28 may make a decision on the release of the item under examination 12, which corresponds to the determination of the lowest hazard level, and/or it can automatically signal the hazard when a hazardous item is recognized in the image B, which corresponds to the determination of a higher hazard level.

If the confidence parameter V of an identified link to a reference item is below the threshold value or no correspondence to image data BD in the database could be determined in the image, the image B is forwarded to the evaluation unit 28 for visual evaluation by the user 24. In the case mentioned first, the automated evaluation unit 20 cannot definitively determine the hazard level, but rather the evaluation unit 20 can inform the user 24 of a suspicion that a particular reference item is in the item under examination 12. In this case, the user 24 is intended to use the visual evaluation unit 28 to confirm or not confirm this suspicion, this information being considered to be the evaluation input 38.

The database DB can be processed using a database processing unit 40 which is part of the examination apparatus 10. This is illustrated in FIG. 2. The database processing unit 40 which is operatively connected to the storage unit 26 (or to a remote database server via a data network) can be used to update the database DB by generating new database entries DB.i and/or changing or replacing existing database entries DB.i.

The database processing unit 40 is advantageously configured to make changes to the database DB in conjunction with the determination of the hazard level for an item under examination 12. For this purpose, the evaluation inputs 38 by the user 24, which originate from the determination of the hazard level for the item under examination 12 currently being examined, are taken into account. The database DB is therefore updated during the examination mode, that is to say during conventional normal operation, the evaluation inputs 38 input by the user 24 being recorded and taken into account for processing a database entry or a plurality of database entries DB.i.

An evaluation input 38 by the user 24 can be used to generate a new database entry DB.i. This is the case, for example, when the user 24 identifies an object in the item under examination 12 which is not contained in the database DB. The user 24 can define the object in his evaluation input 38, that is to say can define it as a reference item G and can assign a hazard level to it. For this purpose, the user 24 can extract a region 42 of the image B (see FIG. 2) which represents the object, this region 42 being used as an evaluation input 38. In this case, the region 42 which is extracted from the image B and represents the object is linked to the new reference item G in the form of a set of image data BD, this link being stored in a new database entry. The confidence parameter V is set to a minimum value when generating a new database entry.

In addition, an evaluation input 38 by the user 24 can be used to change the confidence value V.i of a database entry DB.i. As already described above, the automated evaluation unit 20 can inform the visual evaluation unit 28 and thus the user 24 of a suspicion in the event of a confidence parameter V.i below the threshold value. If this suspicion is confirmed by the user 24, the confirmation can be recorded, as an evaluation input 38, by the database processing unit 40 which then increases the corresponding confidence value V.i by a predetermined value. If the confidence value reaches the threshold value for this database entry DB.i, the automated evaluation unit 20 can itself make a decision on the release of the item under examination 12 with respect to the corresponding reference item or the signaling of a high hazard level during subsequent examination. The practice of taking into account the evaluation input 38 therefore contributes to a learning process of the automated evaluation unit 20.

The examination apparatus 10 described using the drawings is not restricted to the examination of pieces of luggage. Use of the concept according to the invention in conjunction with the examination of freight containers or passengers is likewise conceivable. In terms of use, the examination apparatus is not restricted to use in an airport either. It is likewise suitable for use in other environments, for example for use by a customs authority monitoring the import of hazardous and/or prohibited goods.

The invention claimed is:

1. An examination apparatus for examining an item under examination in a form of a person or a container, the examination apparatus comprising: a determination unit for determining a relevance level assigned to the item under examination, including a hazard level; an image capture unit for capturing an image of the item under examination; a database; an automated evaluation unit for automatically evaluating at least one section of the image using said database, said automated evaluation unit connected to said image capture unit and said database; a further evaluation unit operated by a user for a visual evaluation of at least one section of the image by the user; an input unit for inputting at least one evaluation input by the user; and a database processing unit connected to and processing said database, said database processing unit processing at least one database entry using the evaluation input in conjunction with a determination of the relevance level; said automated evaluation unit configured to undergo a learning process resulting from a confirmation that said automated evaluation unit has correctly automatically evaluated the at least one section of the image, the confirmation being the at least one evaluation input by the user, wherein the database entry contains image data which are assigned to a reference item and are stored in at least one format suitable for an image recognition method, wherein the database entry contains a confidence parameter which affects the assignment to the reference item.

2. The examination apparatus according to claim 1, wherein during an examination mode a series of items under examination each having at least partially unknown contents are examined, said database being processed during the examination mode.

3. The examination apparatus according to claim 1, wherein said database processing unit generates the database entry using the evaluation input.

4. The examination apparatus according to claim 1, wherein the format corresponds to a vector format.

5. The examination apparatus according to claim 1, wherein said database processing unit processes the image data relating to the database entry using at least one region of the image evaluated by the user.

6. The examination apparatus according to claim 1, wherein a threshold value of the confidence parameter is defined, the threshold value constituting a prerequisite for automatic determination of the relevance level using said automated evaluation unit.

7. The examination apparatus according to claim 6, wherein said database processing unit changes the confidence parameter using the evaluation input.

8. A method for examining an item under examination in a form of a person or a container, which comprises the steps of: determining a relevance level, including a hazard level, to be assigned to the item under examination by the further steps of: capturing an image of the item under examination; with an automated evaluation unit, automatically evaluating at least one section of the image using a database; visually evaluating at least one section of the image by the user, an evaluation input being input by the user, and in which the database is processed; processing at least one database entry using the evaluation input in conjunction with the determination of the relevance level, including a hazard level; and in response to the evaluation input being a confirmation that the automated evaluation unit has correctly automatically evaluated the at least one section of the image, performing a learning process of the automated evaluation unit, wherein the database entry contains image data which are assigned to a reference item and are stored in at least one format suitable for an image recognition method, wherein the database entry contains a confidence parameter which affects the assignment to the reference item.

* * * * *